United States Patent
Marks

[19]

[11] Patent Number: 6,062,617
[45] Date of Patent: May 16, 2000

[54] VEHICLE SIDE DOOR PROTECTOR

[76] Inventor: Monte P. Marks, 256-½ 9th St., Jersey City, N.J. 07302

[21] Appl. No.: 09/204,229
[22] Filed: Dec. 3, 1998
[51] Int. Cl.[7] .................................................... B60R 19/42
[52] U.S. Cl. ............................................................ 293/128
[58] Field of Search ........................ 293/128; 160/84.04, 160/370.23, 370.21, 135, 368.1

[56] References Cited

U.S. PATENT DOCUMENTS

| | | | |
|---|---|---|---|
| 4,014,583 | 3/1977 | Forbes | 293/128 |
| 4,690,446 | 9/1987 | Warren | 293/128 |
| 4,707,009 | 11/1987 | Barnett | 293/128 |
| 4,708,380 | 11/1987 | Cruz | 293/128 |
| 4,750,767 | 6/1988 | Barnett | 293/128 |
| 4,810,013 | 3/1989 | Spears | 293/128 |
| 5,050,925 | 9/1991 | Brown | 293/128 |
| 5,072,979 | 12/1991 | Swinton | 293/128 |
| 5,112,092 | 5/1992 | Pucci | 293/128 |
| 5,129,695 | 7/1992 | Norman II | 293/128 |
| 5,312,145 | 5/1994 | McNeil | 293/128 |

FOREIGN PATENT DOCUMENTS 405286367  11/1993  Japan .................................. 293/128

*Primary Examiner*—Joseph D. Pape
*Assistant Examiner*—Kiran Patel
*Attorney, Agent, or Firm*—Donald R. Heiner, Esq.

[57] ABSTRACT

A removable, portable, foldable protector for side doors of parked vehicles. A plurality of panels, preferably but not necessarily of plastic are connected, side-by-side, by hinges which will allow the panels to fold on each other when folded and to allow the panels to unfold into a locked position and then mounted to the inner and outer edge of each front door by means of a combination plastic-rubber clamp or any other suitable means. Each panel forming the protector further has a foam rubber material attached to the side of the panel that will face the vehicle door. Thus, when the device is installed on the vehicle with the vehicle parked in a parking lot, the opening of an automobile door adjacent thereto will not mar the automobile finish.

7 Claims, 3 Drawing Sheets

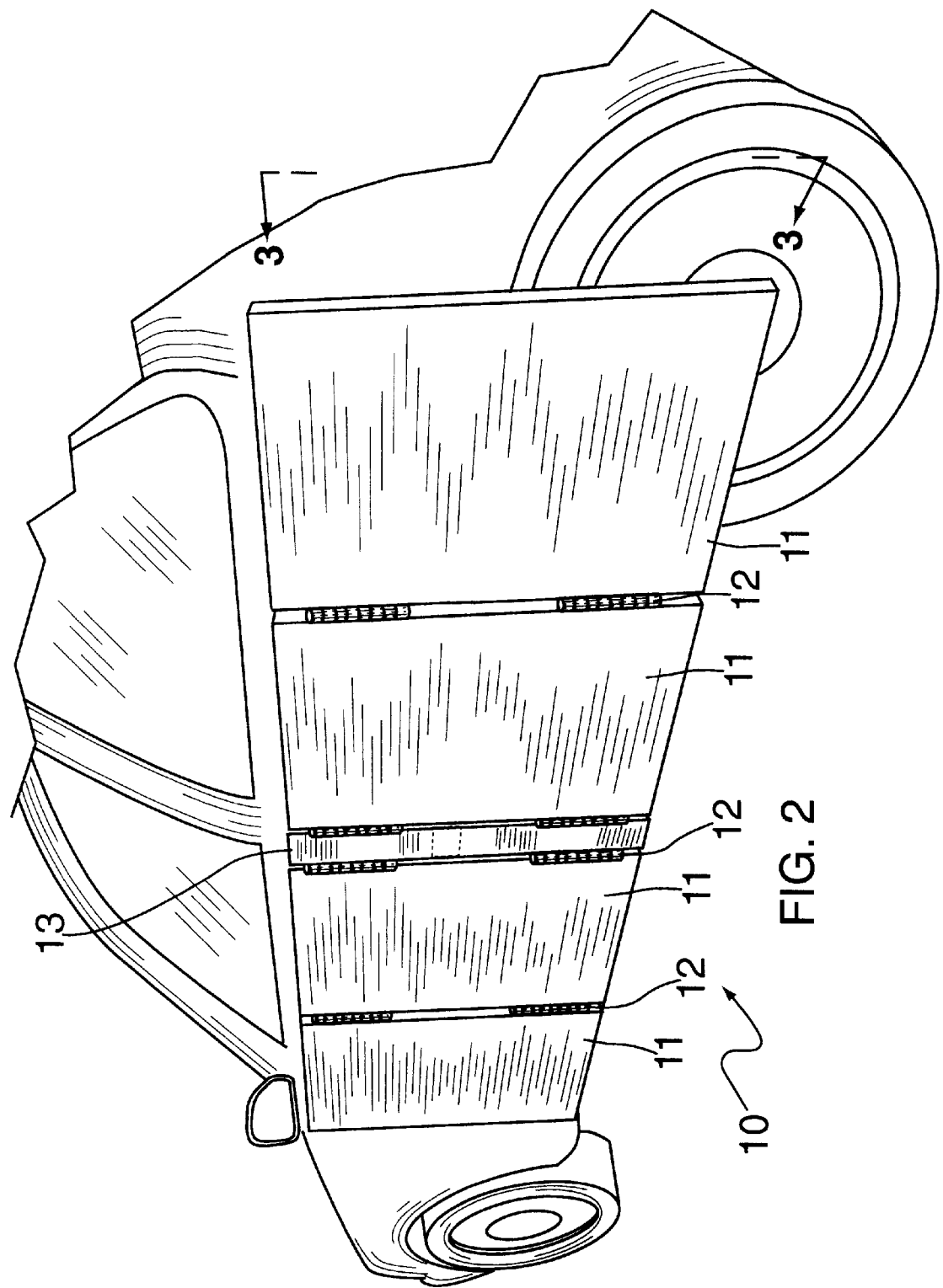

VEHICLE SIDE DOOR PROTECTOR

BACKGROUND OF INVENTION

1. Field of the Invention

The present invention generally involves the field of technology pertaining to a device to be used in conjunction with an automobile for protecting such automobile, while parked, for instance, in a parking lot, from being dented, marked, or marred by the opening of a door of an adjacent automobile. Essentially, the device comprises a plurality of squares or rectangular panels hingedly connected together whereby they can be folded, one panel on another, for easy storage when not in use and which employs hinges which will lock the panels in an unfolded and rigid condition when it is desired to install a protector on an automobile in a parking lot. It should be understood that the panels can be of a shape other than square or rectangular. The side of the panels facing the automobile further comprises foam rubber or other pliable soft material to further protect the automobile from impact.

2. Description of the Prior Art

A search of the prior art has uncovered the following patents: U.S. Pat. No. 3,704,037 to Glassberg; U.S. Pat. No. 3,610,684 to Richter; and, U.S. Pat. No. 4,217,715 to Bryan, Jr.

The patent to Glassberg, U.S. Pat. No. 3,704,037 does not disclose the side-by-side hingedly connected panels but rather discloses "A Door Protector that is formed of corrugated paperboard which is scored along parallel lines at 26 to provide slat like portion 27 intermediate the scored parallel fold lines 26." The slats collapse and fold in an accordion like manner unlike that which is disclosed in the instant invention.

The patent to Richter, U.S. Pat. No. 3,610,684 also does not disclose a series of side-by-side hingedly connected panels but rather discloses a "carpet pad" which hooks to the door handle.

Finally, the patent to Bryan, Jr., U.S. Pat. No. 4,217,715 relates to a side guard or protector wherein the support frame of the protector "is slidable in simple guide brackets secured to the bottom of the vehicle." When extended, the protectors then swung to an upright position to protect the automobile body. Again, this patent does not disclose the series of panels mounted side-by-side and hingedly connected and wherein one panel can be folded on another to form a small compact device or extended to its useable position and then locked into a rigid form.

Also uncovered during a search but not deemed particularly relevant are patents to King, U.S. Pat. No. 2,675,983; London, U.S. Pat. No. 3,563,594; Gunn, U.S. Pat. No. 4,628,624; and, Brunken, U.S. Pat. No. 2,212,493.

SUMMARY OF THE INVENTION

According to the present invention there is provided a device which enables a person to quickly, effectively, and safely protect the side doors as well as other areas of the sides of an automobile especially when the automobile is parked in a crowded parking lot; such as the parking lot of a shopping mall.

An extremely important feature of this invention is the fact that in its folded condition, that is not mounted to the vehicle, it is extremely compact and light in weight and therefore can be easily stowed and carried in the automobile when not in use.

Further, the device can be adapted to protect almost any size vehicle by changing the length and height and the number of hingedly connected panels.

The side of each panel that will interface with the surface to be protected will have attached thereto in any convenient manner, material, such as foam rubber or any other suitable soft, pliable material such that when a force is applied to the outer side, preferably not but necessarily made of plastic, the impact will be absorbed thereby preventing a damaging impact to the vehicle surface.

Locking type hinges will be provided between adjacent panels so that when the device is in its extended position and mounted to the vehicle, the panels will be in a locked and rigid position.

While any suitable means may be used for mounting the unfolded and extended device to the vehicle there is shown herein an attachment means that slidably fits over the vehicle door which is in essence a clamp means preferably made of a combination of rubber, plastic, and metal.

It is therefore an object of the present invention to provide a vehicle side door protector comprising a plurality of plastic panels.

It is another object of the invention to provide the vehicle side door protector comprising a plurality of panels that are hingedly connected to each other by means of locking hinges.

It is a further object of the invention to provide such a vehicle side door protector wherein one side of the panels has affixed thereto foam rubber or other soft plyable material for engaging the vehicle surface when the panels are impacted.

It is still a further object of the invention to provide such a vehicle side door protector wherein such protector can comprise a plurality of panels of various heights and widths to accommodate any size vehicle.

It is yet a further object of the invention to provide such a vehicle side door protector wherein the plurality of panels may be folded one upon another in a compact form for easy storage when not in use.

These and further objects, features, and advantages of the invention shall become apparent from the following detailed description of a preferred embodiment thereof when taken in conjunctions with the drawings wherein like reference characters refer to corresponding parts in the several views.

BRIEF DESCRIPTION OF THE DRAWINGS

FIG. 2 is a view similar to FIG. 1A but showing the vehicle side door protector mounted on an automobile.

DETAILED DESCRIPTION OF THE PREFERRED EMBODIMENT

A removable, portable, foldable protector for the side doors of parked vehicles wherein the device comprises a plurality of hingedly connected side-by-side plastic panels or the like which, when folded, forms a compact and light weight and easily storable device which can be easily mounted to the edge of an open car door by means of a clamping device will now be described with reference to FIGS. 1A–5 of the drawings.

Figure 1A:
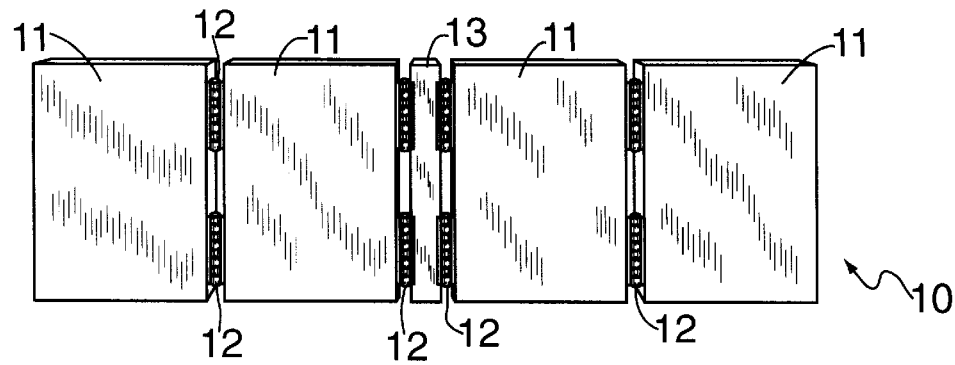
FIG. 1A is a front view of the Protector showing the panels, hinges, and a center binder in an extended condition.
Figure 1B:
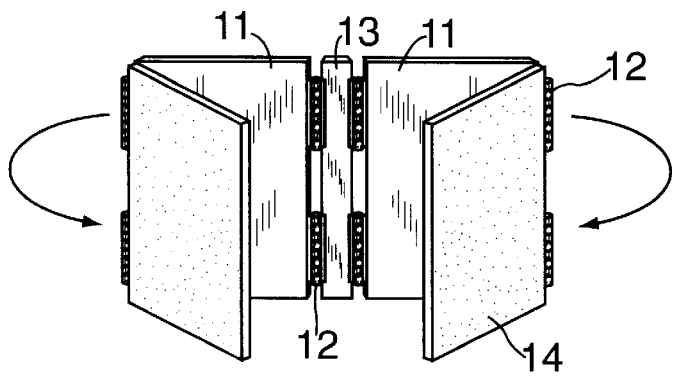
FIG. 1B is similar to FIG. 1A but showing the outer two panels beginning to fold in on the two center panels and center binder.
Figure 1C:
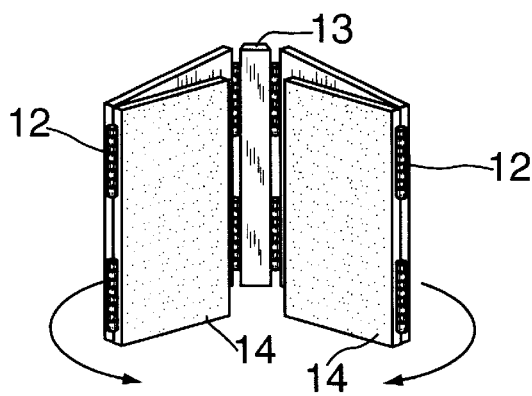
FIG. 1C is a view similar to FIGS. 1A and 1B but showing the outer panels nearly completely folded upon the inner panels.
Figures 1D, 1E, 3:
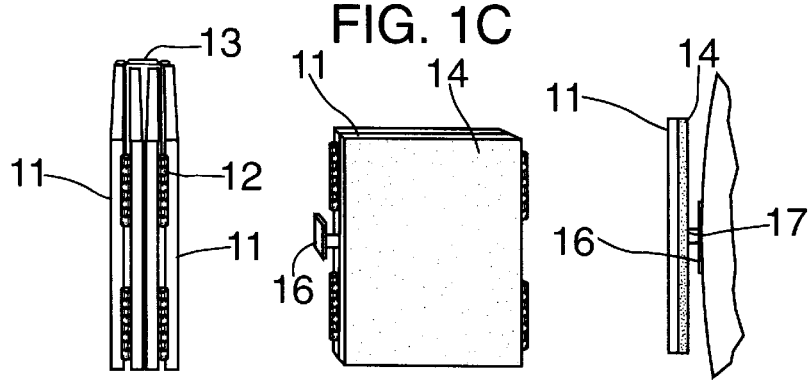
FIG. 1D is an end view showing the panels in a fully folded condition.
FIG. 1E is a side view of the panels in a folded condition showing the back side of the panels and further showing the door edge clamp.
FIG. 3 is an end view taking on line 3—3 of FIG. 2 and showing the side door protector mounted to an automobile.
Figure 4A:
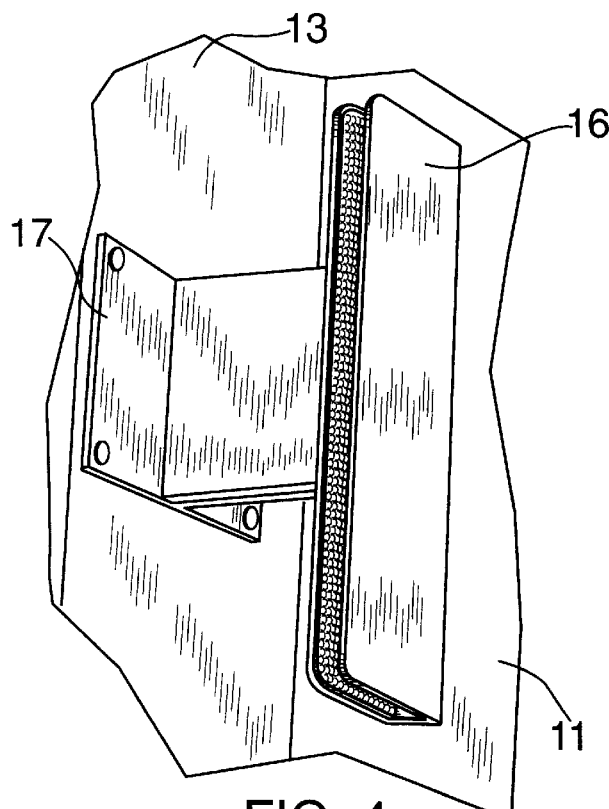
FIG. 4A is a view of a "T" shaped mounting bracket affixed to the Protector and to a door clamp.
Figure 4B:
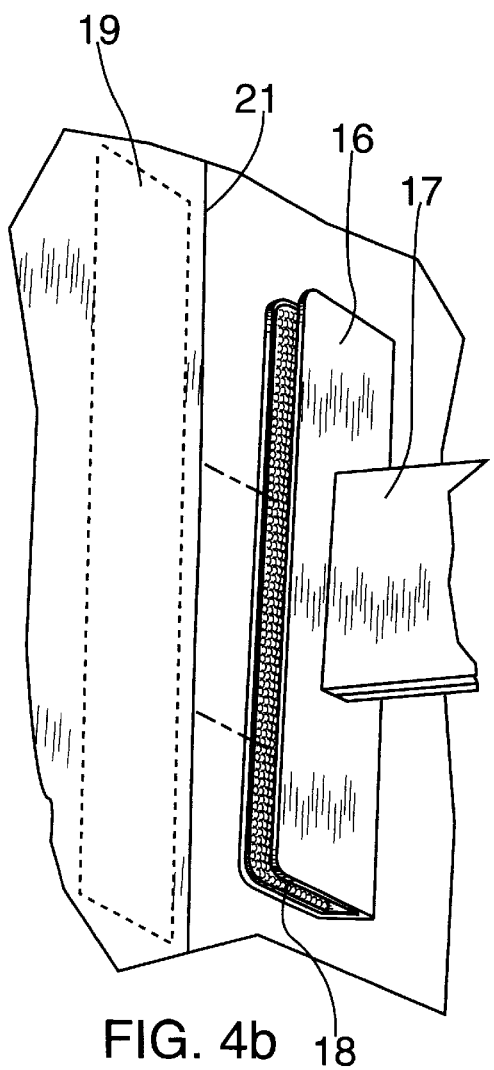
FIG. 4B is a view similar to FIG. 4A showing the door clamp nearly engaging the edge of an automobile door and further showing, in phantom, velcro tape disposed on the inside of the car door.
Figure 5:
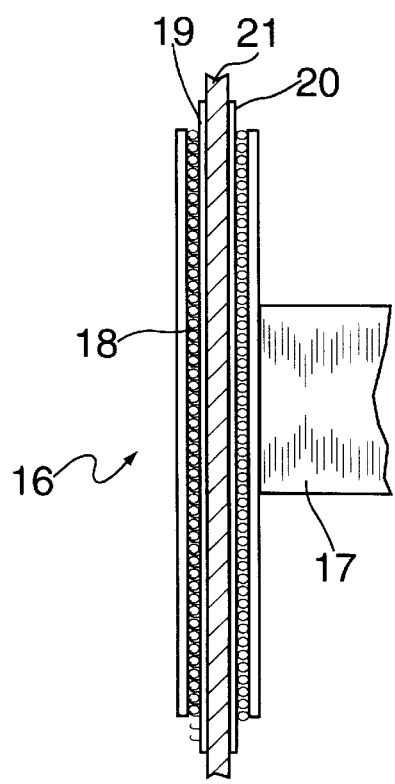
FIG. 5 is a side view showing the door clamp, partial view of the mounting bracket, automobile door shown in section, female velcro material on the clamp, and male velcro tape affixed to the automobile door, and a second strip of female velcro on the automobile door.

The device comprising the instant invention is best scene in FIGS. 1A–1E which discloses a basic device, a removable, portable, foldable protector for the side doors of parked automobiles and wherein FIGS. 2 and 3 show the protector device mounted to the side of an automobile and wherein FIGS. 4A, 4B, and 5 show the preferred means of mounting the protector to the automobile basically comprising a clamp, a T-shaped bracket disposed between the protector and the clamp, and the clamp further comprising a U-shaped object having female velcro disposed therein for engaging male velcro tape affixed to the inside of the automobile door.

As seen particularly in FIGS. 1A–1C, there is provided a protector generally shown as 10 for side doors parked vehicles wherein the protector is removable from the automobile and is both portable and foldable especially as clearly seen in FIGS. 1B, 1C, and 1D.

The protector 10 comprises a plurality of generally square or rectangular shaped panels 11 disposed in a side-by-side relationship as clearly seen in the unfolded position shown in FIG. 1A. Disposed between the panels 11, for holding them in such a relationship, are hinges 12 which also serve to lock the panels in the open position shown in FIG. 1A.

Disposed between the two inner most panels is a binder 13 which serves as a backing when the outer panels are folded against the inner most panels and those inner most panels are further rotated into a book like position as shown in FIGS. 1d and 1e. The same locking hinges 12 hingedly attached between the panels 11 are also provided between the inner most panels and the binder again, as clearly seen, in FIGS. 1A, 1B, 1C, and 1D.

While these panels are preferably made of a hard, durable plastic material, they may be made of any other suitable material which would resist marring or denting on impact.

The reverse side of these panels 10, have a foam rubber material 14 attached thereto as most readily seen in FIGS. 1B and 1C. It is this foam rubber material side of the panels that will rest against the automobile when the protector is in its open, extended, and locked position and mounted on the automobile as clearly shown in FIG. 2. It is to be understood that any other soft pliable material may be used in place of the foam rubber material.

"U" shaped clamp is slidably received over the edge of an opened automobile door 21 as best seen in FIGS. 4B and 5. A "T" shaped mounting bracket 17 attached the "U" shaped clamp 16 to the foldable protector 10.

"U" shaped clamp 16 is best seen in FIGS. 4A, 4B, and 5.

A "T" shaped mounting bracket 17 is attached to the "U" shaped clamp 16 by any suitable means and, in turn, the "T" shaped mounting bracket, at its other end, is attached to the foldable protector 10 also by any suitable means.

The function of the clamp 16 is to attach foldable protector 10 to the side of the automobile when the automobile is parked and protector 10 is in its unfolded and locked position such as shown in FIGS. 1A and 2.

The "U" shaped clamp slidably engages the edge 21 of the automobile door when the door is opened. Attached to the inner face of clamp 16 is a strip of female velcro 18 which cooperates with the male velcro strip 19 attached by any suitable means to the inner edge of the automobile door 21 as best seen in FIGS. 4B and 5. The inner face of the "U" shaped clamp 16, opposite the female velcro strip 18, has a second female velcro strip 20 disposed therein to protect the finish on the automobile door when "U" shaped clamp 16 is in place. This is best seen in FIG. 5.

As clearly seen in FIGS. 4B and 5, Clamp 16 slides over car door edge 21 and is held in place by means of the inter action or mating of the velcro strips 18 and 19.

In operation, after the automobile is parked, the foldable protector in its neatly and compactly folded condition such as shown in FIG. 1D is attached to the automobile door by means of sliding the "U" shaped clamp over the edge of the door. The panels are then unfolded in the reverse order of FIGS. 1C, 1B, and finally 1A. The protector is then in its proper position as shown in FIG. 2. The surface of the panels that interact with the surface of the automobile have foam rubber backings and the front surface as seen in FIGS. 1A and 2 are preferably of a hard plastic or other penetration resistant material.

When another object, such as the door of an automobile parked adjacent thereto is opened and impacts on a panel 11, the impact will be absorbed and the foam rubber backing will impinge against the automobile surface thereby protecting it from scratching or marring.

When the protector is to be removed from the automobile, its panels are folded successively as shown beginning with the FIG. 1A and proceeding through 1B, 1C, and finally 1D where it is in a neat, compact folded condition making it readily storable. The entire foldable protector is then removed by disengaging the "U" shaped clamp from the edge of the automobile door.

The device is then easily stowed since it is light in weight and compact.

Though the invention has been described and illustrated with reference to a preferred embodiment thereof, those skilled in the art will appreciate the various changes and modifications in shape, size, composition, and arrangement of parts may be resorted to without departing from the spirit of the invention or scope of the subjoined claims.

What is claimed:

1. A foldable, stowable protector for mounting to a side of an automobile to provide protection against impact wherein said protector comprises:

(a) a plurality of panels hingedly connected by a plurality of hinges;
   (b) means for mounting said protector to said automobile;
   (c) a mounting bracket for attaching said mounting means to said protector; and,
   (d) a backing disposed between two of the inner most panels of said protector to stabilize the protector when said panels are in a folded stowable position.

2. The foldable, stowable protector of claim 1 wherein the outer surface of said panels, not contacting said automobile, comprises an impact resistant material.

3. The foldable, stowable protector of claim 2 wherein the inner surface of said panels, contacting said automobile, is of a soft pliable material.

4. The foldable, stowable protector of claim 3 wherein said mounting means to said automobile is a "U" shaped clamp.

5. The foldable, stowable protector of claim 4 wherein said "U" shaped clamp is slidably received over an automobile door edge for holding said protector in place on said automobile.

6. The foldable, stowable protector of claim 5 wherein said "U" shaped clamp has a female velcro strip disposed on one inner surface thereof for engaging a male velcro strip attached to the inner surface of said automobile door edge for holding said protector in place on said automobile.

7. The foldable stowable protector of claim 6 wherein said mounting bracket is generally "T" shaped.

* * * * *